United States Patent [19]

Anderson et al.

[11] Patent Number: 4,934,897
[45] Date of Patent: Jun. 19, 1990

[54] PIPE-MOVING APPARATUS

[75] Inventors: Ronald L. Anderson; John Kinney, both of Burlington, Iowa

[73] Assignee: J. I. Case Company, Racine, Wis.

[21] Appl. No.: 314,871

[22] Filed: Feb. 23, 1989

[51] Int. Cl.⁵ .............................. B66F 9/00; E02F 5/00
[52] U.S. Cl. .................................. 414/694; 414/722; 414/727; 414/910
[58] Field of Search ............... 414/722, 723, 685, 694, 414/912, 910, 607, 727, 745.4; 901/27, 28

[56] References Cited

U.S. PATENT DOCUMENTS

| | | | |
|---|---|---|---|
| 2,827,184 | 3/1958 | Mueller | 414/607 |
| 3,557,387 | 1/1971 | Ohlenbusch et al. | 901/28 |
| 3,834,566 | 9/1974 | Hulfiker | 404/694 |
| 3,874,532 | 4/1975 | Metailler | 414/694 |
| 4,251,181 | 2/1981 | Drott et al. | 414/723 |
| 4,272,220 | 6/1981 | Garcia | 414/607 |
| 4,355,477 | 10/1982 | Holmgren et al. | 414/685 |
| 4,393,541 | 7/1983 | Hujsak et al. | 901/28 |
| 4,480,942 | 11/1984 | Farrow | 414/694 |
| 4,515,522 | 5/1985 | Sonerud | 414/910 |

FOREIGN PATENT DOCUMENTS 2169579 7/1986 United Kingdom ............... 414/722

Primary Examiner—David H. Brown
Attorney, Agent, or Firm—Law Firm of Peter N. Jansson, Ltd.

[57] ABSTRACT

An improved pipe-moving apparatus is disclosed having a pipe-insertable elongate member which is articulated for ease of use, particularly for pipe laying near trench ends. In a preferred form, the elongate member has a series of at least two carrier members pivotably interconnected end-to-end, with the proximal end of such series of carrier members attached to the controlling mechanism, and structure supporting the carrier members in alignment when the carrier member series is suspended by its proximal end. A highly preferred embodiment accommodates the removable insertion of one or more additional carrier members in the series to extend the length of the elongate member.

18 Claims, 3 Drawing Sheets

PIPE-MOVING APPARATUS

FIELD OF THE INVENTION

This invention is related generally to pipe-moving apparatus and, more particularly, to pipe-moving apparatus of the type having a pipe-insertable elongate member attached to and controlled by a controlling mechanism such as a backhoe.

BACKGROUND OF THE INVENTION

Pipe sections may be moved for various purposes using different implements. One common pipe-moving operation is the laying of pipe in trenches, such as trenches which have been dug by a backhoe bucket or other trenching mechanism. Many different kinds of pipe-moving implements have been used in this and other pipe-moving operations.

In one type of pipe-moving equipment, a pipe-insertable elongate member, which is attached to a controlling mechanism such as a backhoe, is inserted into one end of a section of pipe and then raised to lift the pipe from the ground and move it to the intended location. One example of this kind of pipe-moving equipment is seen in U.S. Pat. No. 3,834,566.

Pipe-moving devices of this general type have certain advantages over pipe-cradling suspension devices and other pipe-moving devices. However, such devices have certain problems and shortcomings.

In such devices, the pipe-insertable elongate member is rigid, such that it must be withdrawn after lifting operations by a movement which continues in one general direction until the distal end of the elongate member clears the end of the pipe into which it had been inserted. This can make the withdrawal operation somewhat difficult and can require more space for the withdrawal motion than may be available.

For example, if a section of pipe has been laid near the end of a trench, the end of the trench may block withdrawal of the elongate member. Therefore, it may be necessary to use a different sort of pipe-carrying apparatus or a jury-rigged arrangement perhaps involving threading cable through the pipe or around it or cradling the pipe in some manner. Or it may involve simply dropping the pipe into the trench, an operation which should usually be avoided.

Another shortcoming of prior pipe-moving implements of the type having pipe-insertable elongate members is that such devices will typically accommodate only pipe sections which are within a certain size range. Thus, pipe sections having a substantially longer length than are typically moved by such apparatus must be moved by other means or with a completely different device of the same sort having a pipe-insertable member of greater length.

There is a need for an improved pipe-moving apparatus of the type having a pipe-insertable elongate member attached to a controlling mechanism, such as a backhoe. Such improved device would preferably also be readily attachable to a backhoe or other similar controlling mechanism which is used by a variety of other purposes.

OBJECTS OF THE INVENTION

It is an object of this invention to provide an improved pipe-moving apparatus overcoming some of the problems and shortcomings of the prior art.

Another object of this invention is to provide improved pipe-moving apparatus of the type having a pipe-insertable elongate member attached to a controlling member such as a backhoe.

Another object of this invention is to provide improved pipe-moving apparatus of the type having a pipe-insertable elongate member attached to a controlling member which requires less space for withdrawal of the elongate member after a pipe-moving operation.

Another object of this invention is to provide improved pipe-moving apparatus of the type described which may be readily used for laying pipe sections in trenches particularly in positions at or near the trench end.

Another object of this invention is to provide improved pipe-moving apparatus of the type with a pipe-insertable elongate member which may be readily adjusted to accommodate pipe sections of widely varying lengths.

Another object of this invention is to provide improved pipe-moving apparatus of the type described which is easy to operate and may readily be attached to a backhoe or other controlling mechanism which is typically used for other purposes, such as excavations including trench excavation.

These and other important objects will be apparent from the descriptions of this invention which follow.

SUMMARY OF THE INVENTION

This invention overcomes some of the shortcomings and problems of pipe-moving apparatus of the prior art which are mentioned above, particularly in apparatus of the type having pipe-insertable elongate members which are attached to a controlling mechanism, such as a backhoe.

The improved pipe-moving apparatus of this invention has an elongate pipe-insertable member which is articulated, having a plurality of pivotably interconnected carrier members. The pipe-moving apparatus of this invention also includes means to support the carrier members in alignment when the series of carrier members is suspended by its proximal end. The means to support the carrier members in alignment is preferably provided by the structure of the carrier members.

Stated in more detail, this invention has an elongate member with a series of at least two carrier members pivotably interconnected end-to-end, the series having a proximal end, means to attach the proximal end to the controlling mechanism (e.g., backhoe), and means to support the carrier members in alignment when the series is suspended by its proximal end. The means to attach the proximal end to the controlling mechanism is a pivot attachment means.

In particularly preferred embodiments, the means to support the carrier members in alignment includes abutting end surfaces on each adjacent pair of the carrier members. Such adjacent pair of carrier members preferably have a hinge means adjacent to the abutting end surfaces.

In such embodiments, the elongate member can be said to extend along a principal axis when the series is suspended by its proximal end. The hinge means adjacent to the abutting end surfaces of the carrier members preferably defines a hinge axis which is along a right skew line to the principal axis.

When the series of carrier members is suspended by its proximal end in horizontal position, the carrier members, of course, each have a top surface. In certain highly preferred embodiments of this invention, the hinge means are along such top surfaces of the carrier members.

In highly preferred embodiments, the carrier members have support pads along their top surfaces, for supporting pipe which is being suspended on the elongate member. These support pads preferably have sufficient height such that a pipe which bridges adjacent support pads clears the hinge therebetween.

In preferred embodiments, the means to attach the proximal end of the series of carrier members to the controlling mechanism is a rigid structure including a carrier portion alignable with the series of carrier members and hinged thereto, and a stop portion which is substantially normal to the top of the carrier portion and positioned to engage the end of a pipe on the apparatus. The stop portion preferably has a support pad to engage such pipe end.

In highly preferred embodiments, as indicated above, at least one of the pivot interconnection and attachment means is detachable such that least one additional carrier member may be removably inserted with pivot connections at each end thereof to adjustably extend the length of the elongate member. In this way, the device of this invention can accommodate pipe of widely varying lengths.

The improved pipe-moving apparatus of this invention may be used easily. When it is necessary for its pipe-insertable elongate member to be rigid and straight to support a pipe, it automatically assumes such straight rigid shape. And when withdrawal of such elongate member from a pipe is to occur in a tight space such that the straight shape of the elongate member cannot be maintained, the elongate member readily bends at its pivot points to facilitate withdrawal.

The latter withdrawal movements are particularly helpful when laying a pipe section closely adjacent to the end of a trench. This invention eliminates the necessity in such situations of special steps such as dropping the pipe in place, using a alternate device to suspend and lower the pipe, or extending the trench to accommodate pipe laying.

DETAILED DESCRIPTIONS OF PREFERRED EMBODIMENT

Figure 1:
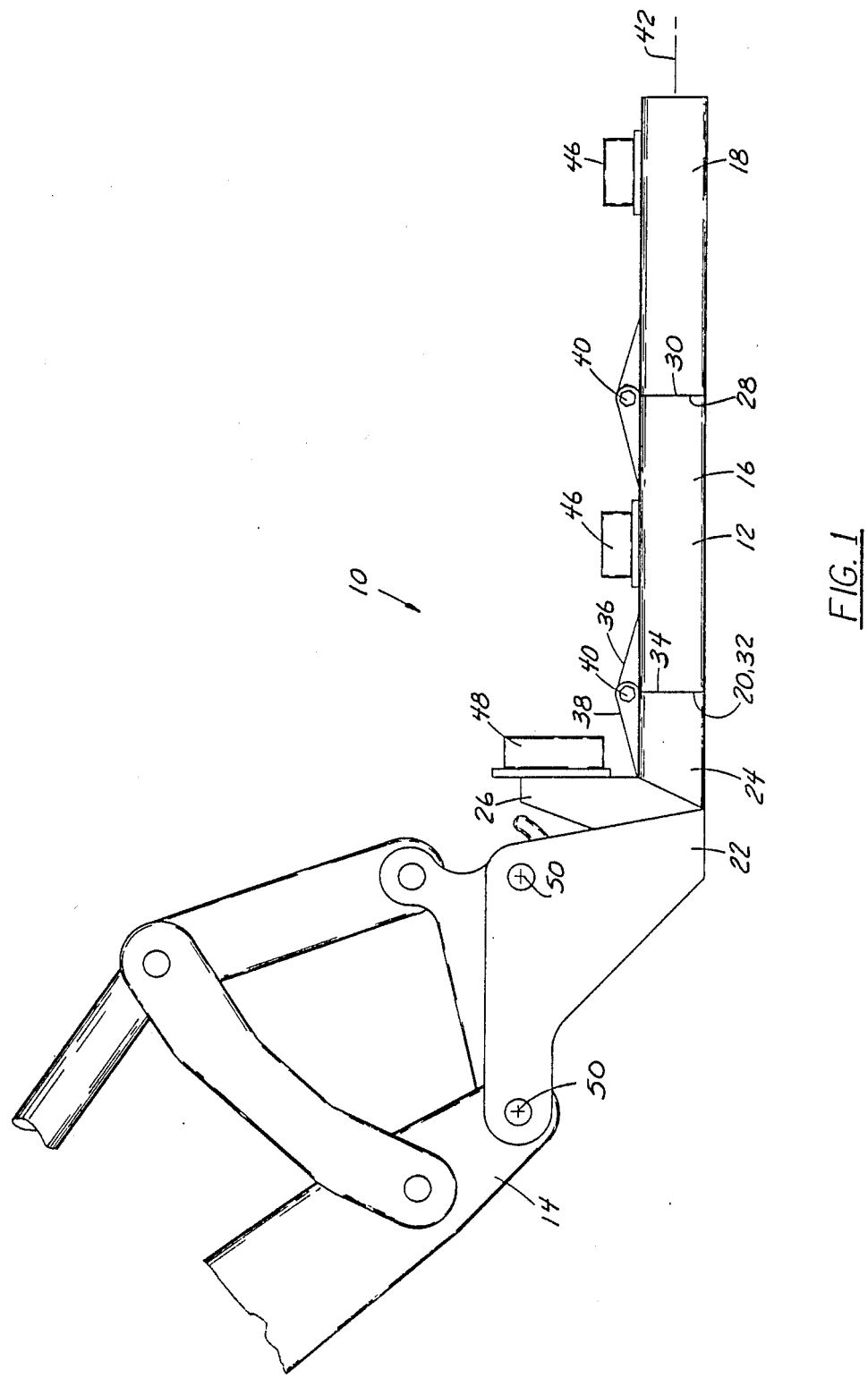
FIG. 1 is a side elevation of a preferred embodiment of this invention attached to a backhoe without supporting a pipe, the elongate member of such preferred device being suspended above ground by the backhoe.
Figure 2:
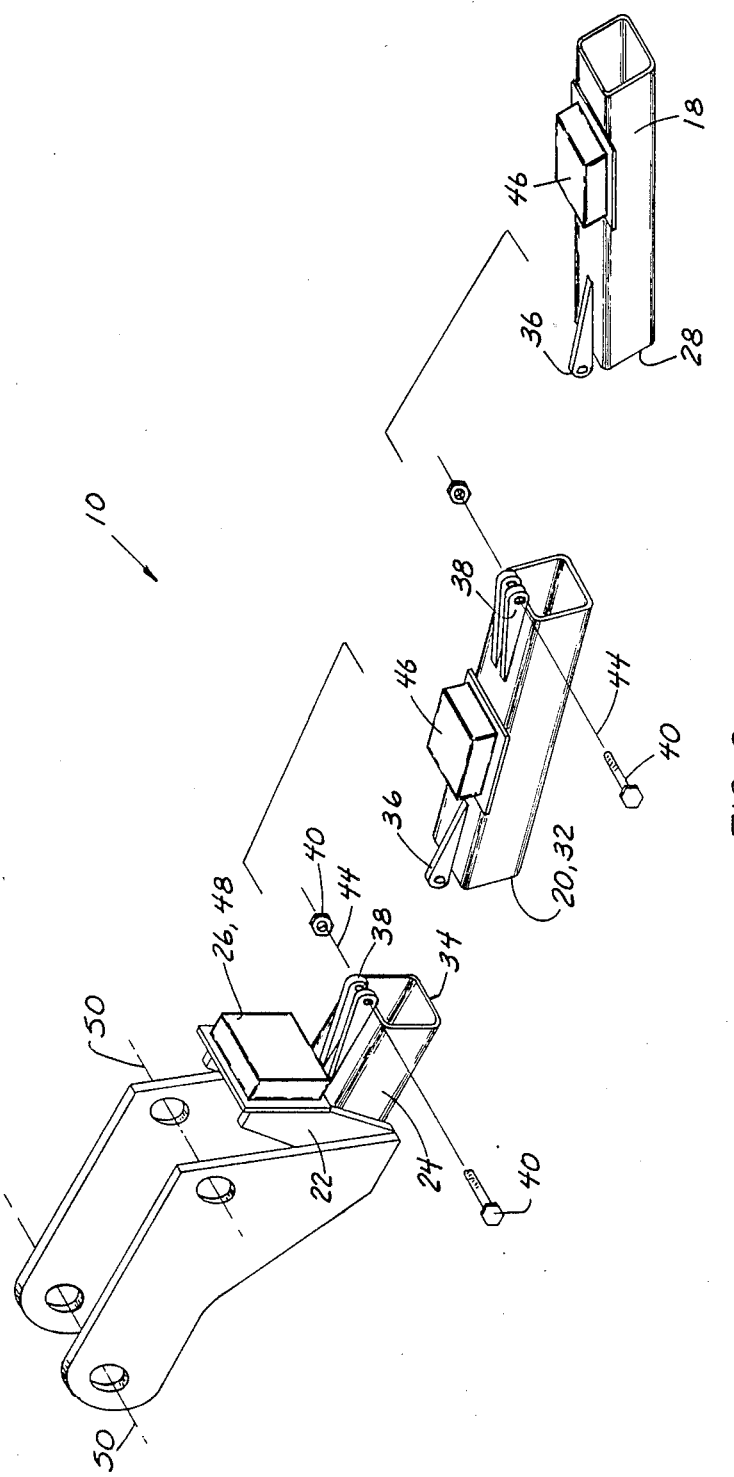
FIG. 2 is an enlarged exploded perspective of the apparatus of FIG. 1.

The figures illustrate a preferred pipe-moving apparatus 10 in accordance with this invention. Pipe-moving apparatus 10 has a pipe-insertable elongate member 12 which is attached to a backhoe 14 or other suitable controlling mechanism. Apparatus 10 is manipulated to lift and move pipe by operation of the normal controls of backhoe 14.

Elongate member 12 has a series of two carrier members, including proximal carrier member 16 and distal carrier member 18. Carrier members 16 and 18 are pivotably interconnected in end-to-end fashion, and this series of carrier members has a proximal end 20 which is attached to backhoe 14 through means hereafter described.

The means for attaching elongate member 12 to backhoe 14 is an attachment member 22 to which proximal carrier member 16 is pivotably attached. The means for securing attachment member 22 to backhoe 14 will be briefly described later.

Attachment member 22 includes a carrier portion 24 and a stop portion 26. Carrier portion 24 and stop portion 26 are rigidly attached to each other by welding or otherwise. Carrier portion 24 is identical in cross-sectional shape to proximal carrier member 16 and distal carrier member 18. Both carrier portion 24 and carrier members 16 and 18 have a square hollow cross section and are made of heavy steel stock. Their linear dimensions together determine the total insertable dimension of the apparatus of this invention.

The pivotable interconnection of carrier portion 24 with proximal carrier member 16 is identical to the pivotable interconnection of proximal carrier member 16 with distal carrier member 18. Considering carrier portion 24 and carrier members 16 and 18 as a group, these parts have two adjacent pairs of abutting end surfaces. That is, distal carrier member 18 has a proximal end surface 28 which abuts distal end surface 30 of proximal carrier member 16. Similarly, proximal carrier member 16 has a proximal end surface 32 which abuts distal end surface 34 of carrier portion 24. Proximal end surface 32 coincides with proximal end 20 of the series of two carrier members 16 and 18.

Figure 3:
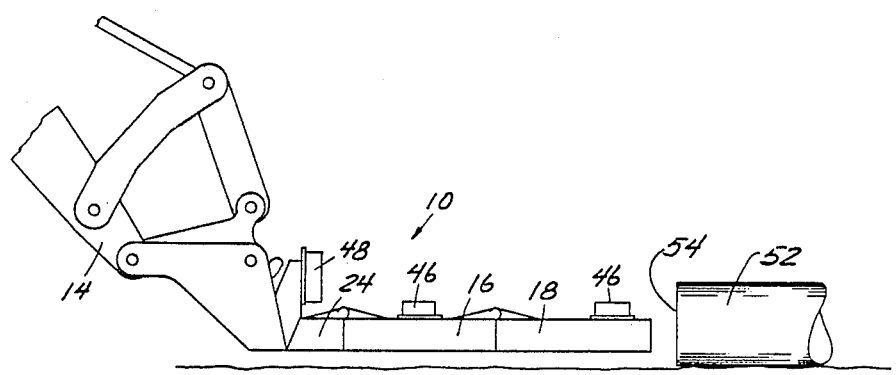
FIG. 3 is a schematic side elevation illustrating the apparatus about to engage and lift a section of pipe.
Figure 4:
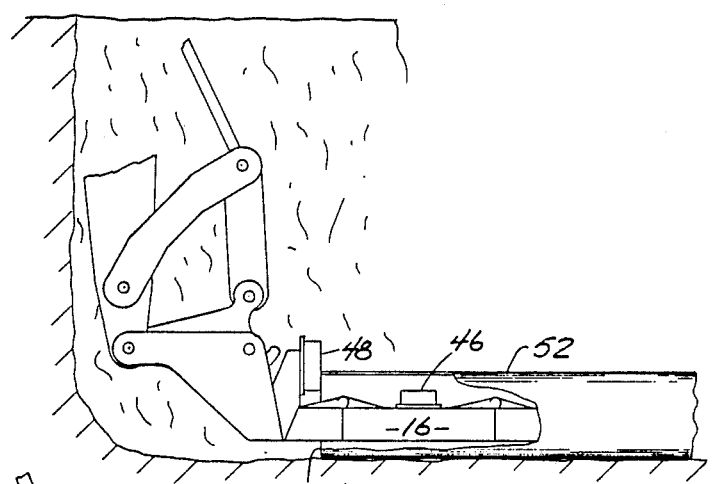
FIG. 4 is a similar schematic, illustrating, however, the apparatus just having laid a pipe near the end of a trench.

The adjacent pairs of end surfaces abut only when elongate member 12 is in its straight aligned position as shown in FIGS. 1, 3, and 4. When carrier members 16 and 18 and carrier portion 24 are in such relative positions of alignment, they extend along a principal axis 42, which is illustrated in FIG. 1.

The adjacent ends of carrier members 16 and 18 and carrier portion 24 are pivotably interconnected by male and female mating hinge members 36 and 38. In each case a bolt and nut combination 40 removably extends through the mating hinge members. Hinge members 36 and 38 are affixed along the top surfaces 39 of carrier members 16 and 18 and carrier portion 24. Hinge members 36 and 38 and bolt and nut combinations 40 define hinge axes 44 which are each along a right skew line to principal axis 42. That is, axes 44 are skew to principal axis 42 and their projections across principal axis 42 are perpendicular thereto.

The hinges defined by hinge members 36 and 38 are freely pivotable under gravity or other forces. Thus, when the series of carrier members 16 and 18 are suspended by the attachment of proximal end 20 to attachment member 22, carrier members 16 and 18 pivot downwardly under the force of gravity until the aforementioned end surfaces 28 and 30, and 32 and 34, abut in pairs, as previously described, to support carrier members 16 and 18 in alignment with carrier portion 24 and along principal axis 42.

A support pad 46 is located along the top surfaces 39 of each of carrier members 16 and 18, at a position between hinge members 36 and 38. Support pads 46 preferably each include a hard rubber block for engagement with the inside surfaces of pipe sections. Support pads 46 extend high enough to be above the level of hinge members 36 and 38. That is, they have sufficient height such that a pipe which bridges adjacent support pads 46 of carrier members 16 and 18 clears the hinge members therebetween. This serves to protect the pipe from the damage which could be inflicted if its substantial weight were applied on the small hard portion formed by each hinge.

As noted, attachment member 22 includes a stop portion 26. Stop portion 26 is substantially normal (perpendicular) to top surface 39 of carrier portion 24. Stop portion 26 includes a support pad 48. Like support pads 46, support pad 48 preferably includes a hard rubber block suitable for engagement with pipe, particularly ceramic pipe. Support pad 48 is positioned with respect to top surface 39 and support pads 46 such that it can engage the end edge of a pipe, as illustrated in FIG. 4.

Bolt and nut combinations 40 may readily be disengaged to insert additional carrier members identical to proximal carrier member 16. Such additional carrier member or members are preferably inserted between carrier portion 24 of attachment member 22 and proximal carrier member 16, making the inserted additional carrier member a new proximal carrier member. However, insertion could be at a more forward location.

Attachment member 22 includes two principal pivot attachment points 50 for attachment to backhoe 14. With such two pivot attachment points, the orientation of attachment member 22 can be manipulated using the normal backhoe controls in a manner well understood by backhoe operators. Thus, the attitude and orientation of the pipe-moving apparatus of this invention can easily be adjusted for the task at hand.

Figure 5:
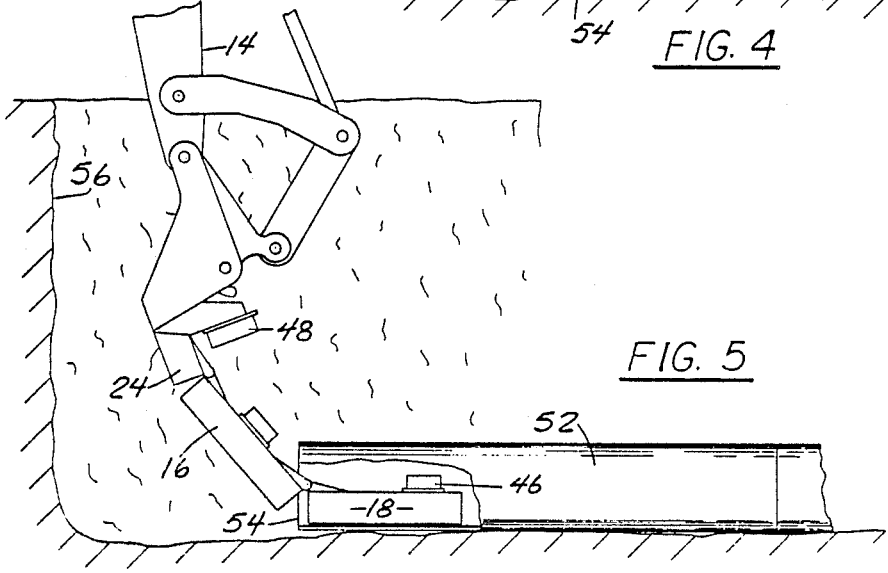
FIG. 5 is another similar schematic, but illustrating the articulated elongate member of this invention partially withdrawn from the pipe which has just been laid near the end of a trench.

FIGS. 3-5 illustrate a typical operation of pipe-moving apparatus 10 of this invention. In FIG. 3, apparatus 10 is shown with elongate member 12 in its straight orientation or position of alignment, and ready for insertion into one end of a pipe section 52. FIG. 4 illustrates the pipe section just after it is released from the support of apparatus 10. Edge 54 of pipe section 52 is still in engagement with support pad 48 and withdrawal of elongate member 12 is about to occur. FIG. 5 illustrates elongate member 12 in an articulated condition as is necessary for withdrawal of elongate member 12 from pipe section 52 at its position near trench end 56.

Pipe-moving apparatus 10 of this invention is preferably made using steel parts and members welded together or connected in a manner which would be apparent to those skilled in the art who are familiar with this invention.

While the principles of this invention have been described in connection with specific embodiments, it should be understood clearly that these descriptions are made only by way of example and are not intended to limit the scope of the invention.

We claim:

1. In pipe-moving apparatus of the type having a pipe-insertable elongate member attached to a controlling mechanism, the improvement comprising:
   the elongate member having a series of at least two carrier members pivotably interconnected end-to-end, the series having a proximal end;
   means to attach the proximal end to the controlling mechanism; and
   means to support the carrier members in alignment when the series is suspended by its proximal end.

2. The pipe-moving apparatus of claim 1 wherein the means to attach the proximal end to the controlling mechanism is a pivot attachment means.

3. The pipe-moving apparatus of claim 2 wherein the means to attach the proximal end to the controlling mechanism comprises:
   a carrier portion alignable with the series of carrier members and hinged thereto, said carrier portion having a top surface; and
   a stop portion substantially normal to the carrier portion top surface thereby to engage the end of a pipe on the apparatus.

4. The pipe-moving apparatus of claim 3 wherein the stop portion has a support pad to engage a pipe end.

5. The pipe-moving apparatus of claim 2 wherein the supporting means comprises abutting end surfaces on each adjacent pair of the carrier members.

6. The pipe-moving apparatus of claim 5 wherein the pivotable interconnection of each of the adjacent pairs of carrier members comprises a hinge which is adjacent to the abutting end surfaces and defines a hinge axis.

7. The pipe-moving apparatus of claim 6 wherein: the elongate member extends along a principal axis when the series is suspended by its proximal end; and each of the hinge axes is along a right skew line to the principal axis.

8. The pipe-moving apparatus of claim 6 wherein, when the series of carrier members is suspended by its proximal end in horizontal position, the carrier members each have a top surface, said hinges being along the top surfaces.

9. The pipe-moving apparatus of claim 8 wherein the carrier members have support pads along their top surfaces, said support pads having sufficient height such that a pipe which bridges adjacent support pads clears the hinge therebetween.

10. The pipe-moving apparatus of claim 2 wherein at least one of the pivot interconnection and attachment means is detachable whereby at least one additional carrier member may be removably inserted with pivot connections at each end thereof to adjustably extend the length of the elongate member.

11. The pipe-moving apparatus of claim 10 wherein the means to attach the proximal end to the controlling mechanism comprises:
   a carrier portion alignable with the series of carrier members and hinged thereto, said carrier portion having a top surface; and
   a stop portion substantially normal to the carrier portion top surface thereby to engage the end of a pipe on the apparatus.

12. The pipe-moving apparatus of claim 11 wherein the stop portion has a support pad to engage a pipe end.

13. The pipe-moving apparatus of claim 10 wherein the supporting means comprises abutting end surfaces on each adjacent pair of the carrier members.

14. The pipe-moving apparatus of claim 13 wherein the pivotable interconnection of each of the adjacent pairs of carrier members comprises a hinge which is adjacent to the abutting end surfaces and defines a hinge axis.

15. The pipe-moving apparatus of claim 14 wherein: the elongate member extends along a principal axis when the series is suspended by its proximal end; and each of the hinge axes is along a right skew line to the principal axis.

16. The pipe-moving apparatus of claim 14 wherein, when the series of carrier members is suspended by its proximal end in horizontal position, the carrier members each have a top surface, said hinges being along the top surfaces.

17. The pipe-moving apparatus of claim 16 wherein the carrier members have support pads along their top surfaces, said support pads having sufficient height such that a pipe which bridges adjacent support pads clears the hinge therebetween.

18. In pipe-moving apparatus of the type having a pipe-insertable elongate member attached to a controlling mechanism, the improvement comprising the elongate member having a proximal end adjacent to the controlling mechanism and a series of carrier members extending therefrom, the elongate member being articulated at at least two points spaced along the length thereof and having means to support the carrier members in alignment when the series carrier members is suspended by the proximal end of the elongate member.

* * * * *